Oct. 22, 1929.  A. ZELEWSKI  1,733,043

TRUCK FOR ELECTRICAL APPARATUS

Filed April 6, 1928

Inventor:
Alexander Zelewski,
by Charles E. Tullar
His Attorney,

Patented Oct. 22, 1929

1,733,043

UNITED STATES PATENT OFFICE

ALEXANDER ZELEWSKI, OF BERLIN-OBERSCHONEWEIDE, GERMANY, ASSIGNOR TO GENERAL ELECTRIC COMPANY, A CORPORATION OF NEW YORK

TRUCK FOR ELECTRICAL APPARATUS

Application filed April 6, 1928, Serial No. 268,050, and in Germany May 17, 1927.

My invention relates to trucks for electrical apparatus. Large transformers, oil switches and the like are usually provided with supporting rollers to facilitate movement. The possibility of movement in one direction only is generally sufficient so that it is not necessary that the rollers be swivelled. Depending upon local conditions, however, different directions of movement may be necessary in different cases. The trucks may be more conveniently stored and the cost of production will be reduced if each truck is so arranged that the rollers may be assembled with their axles in different directions. The general object of the invention is to provide an improved truck having these desirable advantages.

Figure 1:
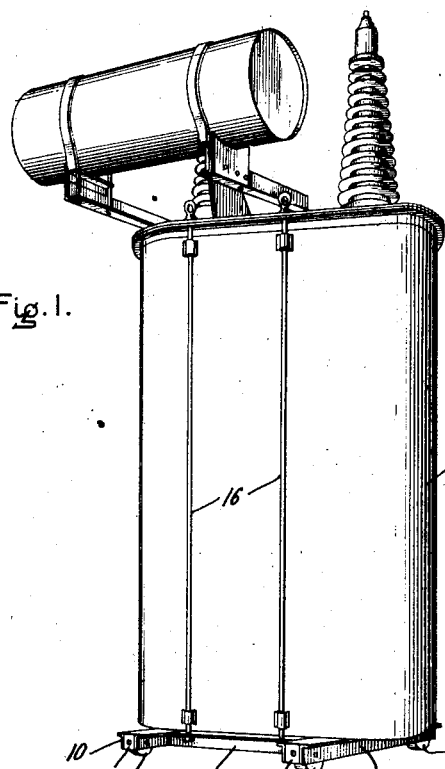
Figure 2:
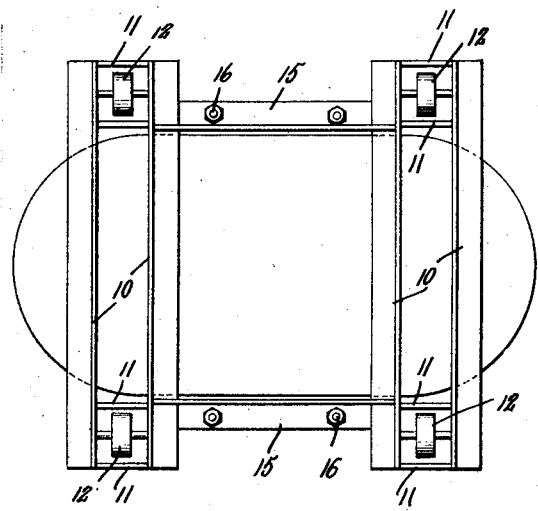
Figure 3:
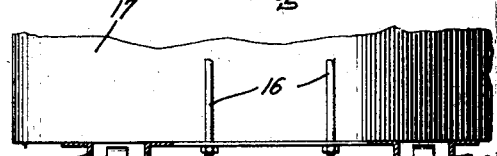
Figure 4:
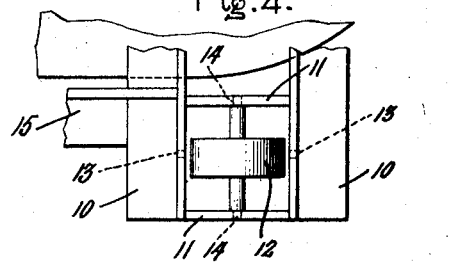

The invention will be better understood from the following description taken in connection with the accompanying drawing in which Fig. 1 is a perspective view of a transformer supported by a truck constructed in accordance with the invention, Fig. 2 is a view from below of the truck shown in Fig. 1, Fig. 3 is an enlarged explanatory detail view, and Fig. 4 is a detail view of a roller mounting.

Like reference characters indicate similar parts in the different views of the drawing.

The particular truck shown in the drawing includes a number of parallel angle irons 10 which are arranged in pairs. The two angle irons of each pair are spaced apart and are connected near each end by two flat spaced metal pieces or plates 11 to which they may be welded. Spaces are thus formed in which the rollers 12 are disposed. The spacing of the two angle irons 10 of each pair is the same as that of the two plates 11 of each pair, this spacing being determined by the dimensions of the rollers 12.

The angle irons 10 are provided with bearings 13 to receive the axles of the rollers 12 and the plates 11 are also provided with bearings 14 to receive the same roller axles. As shown in Figs. 1, 2 and 3, the rollers are shown with their axles in the bearings 13 and with this arrangement the truck may be moved in a direction parallel to the angle irons 10. Fig. 4 indicates the other arrangement in which the roller axles are in the other bearings 14 so that the truck may be moved in a direction transverse to the angle irons 10. When in use, all the rollers should, of course, be arranged with their axles in the same direction. As shown in the drawing, the arrangement of the two sets of bearings 13 and 14 permits assembly of the rollers so that the truck may be moved in either of two directions at right angles to each other. It will be understood, however, that this is only illustrative and that other directions of movement may be provided for as desired.

The pairs of angle irons 10 are connected by cross braces 15 from which tie rods 16 extend to secure in position on the truck a piece of apparatus such as the transformer 17 shown in Fig. 1.

The invention has been explained by describing and illustrating a specific form thereof but it will be apparent that changes may be made without departing from the scope of the invention as defined by the appended claim.

What I claim as new and desire to secure by Letters Patent of the United States, is:—

A truck including two pairs of spaced members, spaced cross pieces secured between the members of each of said pairs of members, rollers provided with axles, said spaced members having one set of bearings arranged to fit said axles, and said cross pieces having another set of bearings arranged to fit said axles, whereby said truck may be assembled with said rollers in either of two directions, cross braces between said pairs of spaced members, and means extending from said cross braces to secure an object on said truck.

In witness whereof, I have hereunto set my hand this 16th day of March, 1928.

ALEXANDER ZELEWSKI.